United States Patent

[11] 3,608,936

| [72] | Inventor | Karl Gosta Karden<br>Nacka, Sweden |
|---|---|---|
| [21] | Appl. No. | 781,362 |
| [22] | Filed | Dec. 5, 1968 |
| [45] | Patented | Sept. 28, 1971 |
| [73] | Assignee | Atlas Copco Aktiebolag<br>Nacka, Sweden |
| [32] | Priority | Dec. 8, 1967 |
| [33] | | Sweden |
| [31] | | 16877/67 |

[54] SOCKET-RETAINING MEANS FOR SPLINED DRIVE SHAFTS
11 Claims, 16 Drawing Figs.

[52] U.S. Cl............................................ 287/53, 287/119
[51] Int. Cl............................................ F16d 1/06
[50] Field of Search............................................ 287/119; 81/177.6; 279/77, 78, 97, 24, 1 R; 24/211 P, 211

[56] References Cited
UNITED STATES PATENTS

| 948,119 | 2/1910 | Wettig.......................... | 24/221 UX |
| 2,460,555 | 2/1949 | Von Voigtlander.......... | 287/119 |
| 2,721,090 | 10/1955 | Kaman......................... | 287/119 |
| 2,851,295 | 9/1958 | Chaffee....................... | 279/1 R |
| 3,011,794 | 12/1961 | Vaughn........................ | 81/177.6 X |
| 3,097,859 | 7/1963 | Sindelar...................... | 287/119 X |
| 3,167,338 | 1/1965 | Troike......................... | 287/119 |

*Primary Examiner*—David J. Williamowsky
*Assistant Examiner*—Andrew V. Kundrat
*Attorney*—Eric Y. Munson

ABSTRACT: A retaining means for retaining a socket element on a splined drive shaft end by way of locking cooperation between the outer extremity of a retaining pin and an internal abutment on the splines of the socket element, the retaining pin being movably journaled in a transverse guide passage in the shaft end transversely of the shaft end and transversely of itself between a retaining position in which the outer extremity of the retaining pin is disposed within the axial extension of one of the grooves of the shaft end and a release position in which the outer extremity of the retaining pin is disposed within the axial extension of a spline on the shaft end.

PATENTED SEP 28 1971 3,608,936

INVENTOR.
Karl Gösta Karden
BY
Eric Y. Munson
Attorney

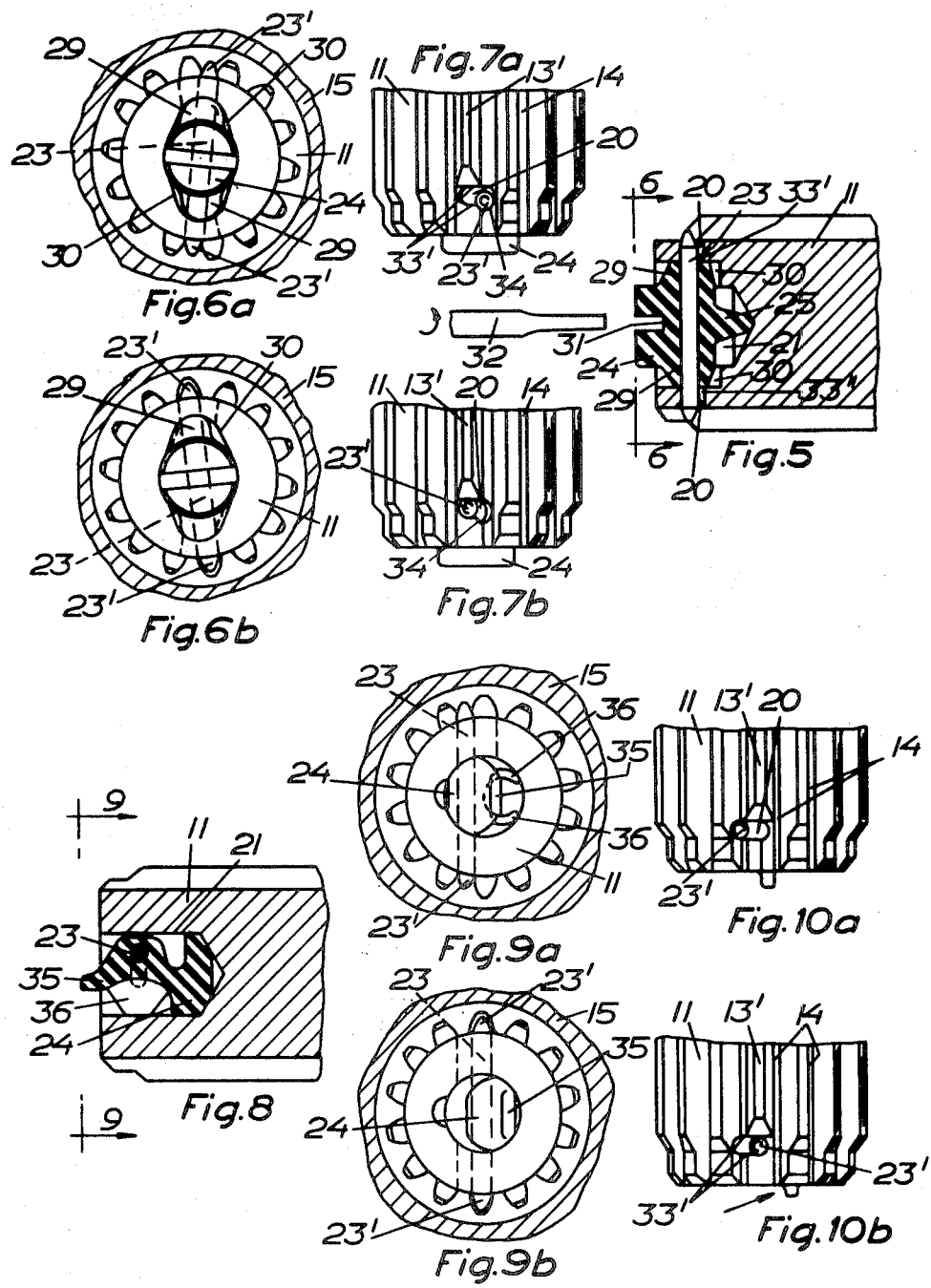

SOCKET-RETAINING MEANS FOR SPLINED DRIVE SHAFTS

This invention relates to socket-retaining means for splined drive shafts and more particularly to socket retaining means for splined drive shaft ends on which a socket element is retained axially releasably by a retainer disposed in a transverse guide passage in the drive shaft end and cooperating by the outer extremity thereof lockingly with an abutment on the internal splines of the socket element. In such retaining means, as hitherto customary, the retainer is a separate journaled machine element which is movable axially in the guide passage to protrude radially therefrom and must cooperate with collars, shoulders or the like in order to be kept in place in the guide passage. It is normally desired to operate the retaining means by way of a control member journaled axially movably in the drive shaft end in an axial bore thereof, and the freely journaled embodiment of the retainer leads to considerable constructional complicity since the retainer and the control member, when assembled, on the one hand must be controllable without any one of them unintentionally falling out of the drive shaft end, and on the other hand both, when necessary, must be easily removable from the drive shaft end.

It is an object of the invention to provide constructionally simplified, effective socket-retaining means of the above-mentioned type which in its function is adapted more directly than previously to the presence of cooperating splines and grooves on the drive shaft end and the socket element to be retained thereon. Another object of the invention is to provide a socket-retaining means of the above-mentioned type in which, for purposes of simplification, direct fixation of the retainer to the control member is made possible. A further object of the invention is to provide a socket-retaining means of the above-mentioned type in which the retainer is formed as a simple retaining pin operable by movements in a direction transverse to the pin itself, the retaining pin preferably traversing the drive shaft end diametrically.

For these and other objects there is according to the invention provided a socket-retaining means for splined drive shafts comprising a drive shaft end having an axial bore extending inward from the end face thereof, a series of longitudinal splines on said drive shaft end alternated by longitudinal grooves, a socket element having an axial bore open at the rear end of thereof and provided with a series of longitudinal internal grooves alternated by internal longitudinal splines detachably fitting said splines and grooves, respectively, of said drive shaft end, abutment means terminating said internal splines within said socket element in said bore, a radial guide passage extending outward from the axial bore in said drive shaft end, a retainer disposed in said guide passage and movable transversely of itself therein between a retaining position, in which the outer extremity of said retainer is disposed within the axial extension of one of said grooves of said drive shaft end for locking cooperation with said abutment means on said socket element when said socket element is fitted on said drive shaft end, and a release position, in which the outer extremity of said retainer is disposed within the axial extension of one of said splines on said drive shaft end for releasing said socket element, and a control member in said axial bore of said drive shaft end for moving said retainer to said retaining and release positions thereof.

The above and other objects of the invention will become obvious from the following description and from the accompanying drawings in which three preferred embodiments of the invention are illustrated by way of example. It should be understood that these embodiments are only illustrative of the invention and that various modifications thereof may be made within the scope of the claims. In the drawings FIG. 1 shows a longitudinal section of a drive shaft end with a socket element set in place thereonto and retained by the releasable retaining means according to the invention.

FIG. 5 shows a longitudinal section of a drive shaft end with another embodiment of the retaining means according to the invention.

FIGS. 6a and 6b are end views shown partly in section of the drive shaft end in FIG. 5 illustrating respectively the retaining position and the release position of the retaining means and seen on the line 6—6 in FIG. 5 when a socket element is placed onto the drive shaft end.

FIGS 7a and 7b are top views of the drive shaft end in FIG. 5 illustrating respectively the retaining position and the release position of the retaining means.

FIG. 8 shows a longitudinal section of the drive shaft end with a third embodiment of retaining means according to the invention.

FIGS. 9a and 9b are end views shown partly in section of the drive shaft end in FIG. 8 illustrating respectively the retaining position and the release position of the retaining means and seen on the line 9—9 in FIG. 8 when a socket element is placed onto the drive shaft end.

Figure 1:
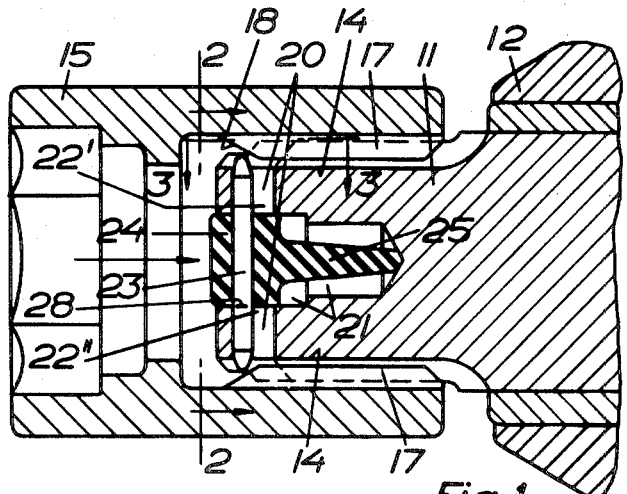
Figure 2A:
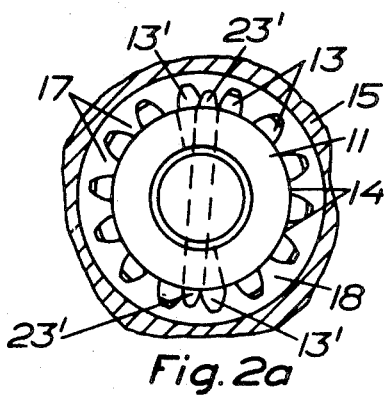
FIGS. 2a and 2b are end views shown partly in section and illustrating the retaining means in FIG. 1 in respectively retaining position and release position as seen on the line 2—2 in FIG. 1.
Figure 2B:
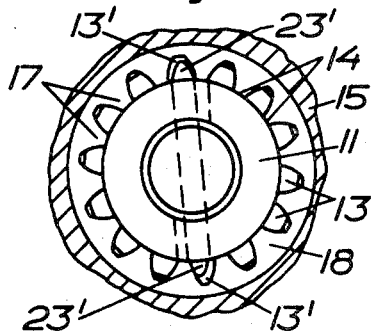

FIGS. 10a and 10b are top views of the drive shaft end in FIG. 8 illustrating respectively the retaining position and the release position of the retaining means. In the embodiment of FIGS. 1—3 a splined drive shaft end 11 forms part of a drive shaft adapted for the transmission of torque in a nut-setting wrench 12 of conventional make, preferably of impact type. The drive shaft end 11 is provided with splines 13 and grooves 14. A socket element 15 in the form of a socket wrench is provided with internal splines 17 at a rearwardly open bore and may be slid by way of these splines into the grooves 14 and onto the shaft end 11. As a result there is created a high-strength engagement for transmitting torque and rotary impacts between the drive shaft end 11 and the socket element 15. The splines 17 of the socket element 15 are terminated in the bore thereof by internal peripheral abutment means or shoulders 18.

The drive shaft end 11 is traversed at the outer end thereof diametrically by a guide passage 20 which is intersected by an axial blind hole or bore 21 in the drive shaft end 11. The guide passage 20 is thus divided into two portions which are shaped as oblong cam slots $22^{1}, 22^{11}$ inclined with respect to the longitudinal direction of the drive shaft end 11. The slots $22^{1}, 22^{11}$ extend between the axial continuation or extension of two peripherally opposed grooves 14 and two peripherally opposed splines $13^{1}$ somewhat shorter in length than the rest of the splines 13. A retainer in the shape of a retaining pin 23 is inserted into the guide passage 20 and is movable in the transverse direction thereof and of itself while guided by the cam slots $22^{1}, 22^{11}$ between a retaining position, FIG. 1, 2a, 3a, in which the outer extremities $23^{1}$ of the retaining pin 23 are disposed in the axial continuation or extension of two peripherally opposed grooves 14 on the drive shaft end 11 from which the cam slots $22^{1}, 22^{11}$ start, and a release position, FIG. 2b, in which the extremities $23^{1}$ of the retaining pin 23 are disposed in the axial continuation or extension of the two peripherally opposed splines $13^{1}$ adjacent to which the cam slots $21^{1}, 22^{11}$ terminate.

The retaining pin 23 is inserted with a press fit through a cross bore in a control member 24 which is axially movably guided in the axial blind hole or bore 21 and is preferably made of rubber or other elastomer material. The control member 24 is movable axially in the axial bore 21 between a normal and an actuated position during which movement the retaining pin 23 follows the cam slots $22^{1}, 22^{11}$ such as to turn the member 24 together with the retaining pin 23 and to displace the retaining pin 23 transversely of itself from the retaining position to the release position during such conjoined movement. When the control member 24 is released it must be returned to its normal position in the axial bore 21, FIG. 1, and therefore the member 24 is set under spring bias preferably by elastic self-deformation. To this end the member 24 is provided with an axial tongue 25 by way of which it abuts on a bottom shoulder or other shoulder of the axial bore 21, FIG. 1. At depression of the control member 24 to the actuated position thereof, the tongue 25 is compressed and bent whereby it, when member 24 is released, returns the member 24 elastically to the normal position shown in FIGS. 1, 3a. According to the modification shown in FIG. 4, the tongue 25 may be replaced by other spring means such as by a helical spring 27 which is inserted between the control member 24 and the bottom shoulder of axial bore 21.

Figure 3A:
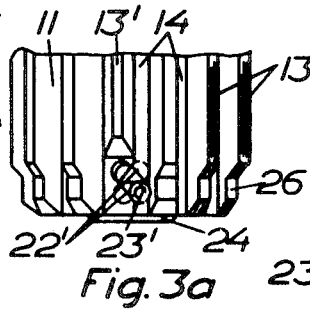
FIGS. 3a and 3b are top views of the drive shaft end in FIG. 1 illustrating the retaining means respectively in retaining and in release position as seen on the line 3—3 in FIG. 1.
Figure 4:
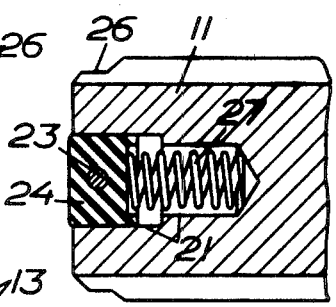
FIG. 4 shows a longitudinal section of the drive shaft end with a modified embodiment of the retaining means according to the invention.
Figure 3B:
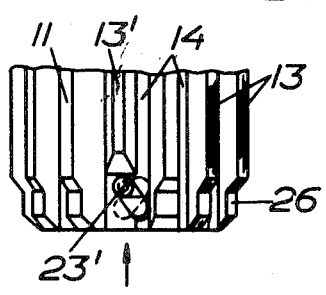

When a socket element 15 is placed onto the drive shaft end 11, such operation may be performed in the embodiment shown in FIGS. 1—3 simply by a spline 17 on the socket element 15 pushing the retaining pin 23 aside without manual actuation of the control member. During such placing the outer extremities 23¹of the retaining pin 23 are thus pushed by two peripherally opposed ones of the internal splines 17 on the socket element 15 axially inwardly, causing the retaining pin 23 to follow the cam slots 22¹,22¹¹and to be moved to the release position shown in FIG. 3b whereupon the socket element 15 may be pushed farther upwards onto the drive shaft end 11. As soon as the internal abutments 18 of two peripherally opposed adjacent splines 17 have passed the extremities 23¹, these extremities 23¹are automatically returned to the retaining position, FIG. 3a, by spring bias of the tongue 25 or of the spring 27 against the control member 24. When the socket element 15 is to be removed, the control member 24 is depressed to the actuated position in the axial bore 21 and the cam slots 22¹, 22¹¹will consequently turn the extremities 23¹to the release position, FIg. 3b, so that the socket element 15 can be freely removed. The splines 13 of the drive shaft end 11 are provided at the forward end thereof with a reduced portion 26 which facilitates setting-on of the socket element 15. Preferably the retaining rod 23 is given a length not exceeding the diameter of reduced portion 26 in order to make possible disposition of the cam slots 22¹, 22¹¹at the outermost tip portion of the drive shaft end 11.

The embodiment in FIG. 1 may be modified by the retaining rod 23 being made for single sided operation only. The cam slot 22¹¹, of the guide passage 20 is in such case omitted entirely and the retaining rod 23 is shortened at the point designated by the broken line 28 in FIG. 1.

In the embodiment of FIGS. 5—7 the control member 24 similarly is provided with a springing tongue 25 which abuts on the bottom shoulder of axial bore 21. The control member 24 furthermore has radial wings 29 thereon. The wings 29 are pushed into diametrical recesses 30 which extend radially form the axial bore 21. The control member 24 is made of rubber and the wings 29 fix the control member elastically against turning within the blind hole 21 in a normal position in which the retaining pin 23 takes the retaining position thereof, FIG. 6a, 7a. The control member 24 is furthermore provided with a turning means 31, shaped as a driving groove in the outer end thereof into which a screwdriver 32 can be inserted for turning the control member 24 to actuated position and the retaining pin 23 to the release position, FIG. 6b, 7b. During such turning the wings 29 are deformed elastically so that the control member 24 is placed under spring bias striving to turn the member 24 back to the normal or starting position, in which the retaining pin 23 takes the retaining position. The retaining pin 23 is supported guidingly for movement transversely of itself by guide slots 33¹, 33¹¹, which in this embodiment are disposed in a transverse plane preferably perpendicular to the drive shaft end 11. For releasably securing the retaining pin 23 in the retaining position thereof, the guide passage 20 may be provided with an axial depression 34, FIGS. 7a , 7b, into which the retaining pin 23 strives to fall under the axial spring bias created by the tongue 25 of the control member 24 bearing against the bottom shoulder of axial bore 21.

In the embodiment of FIGS. 8—10 the rubber control member 24 has the outer extremity thereof made thin and is terminated by an actuator 35 shaped as a tip. The actuator 35 is depressable manually in lateral direction. By depression of the actuator 25 a pair of laterally pointing flaps 36 formed on the member 24 are deformed elastically laterally against the inner wall of the axial bore 21. The flaps 36 extend from the middle portion of the control member 24. By elastic deformation of the flaps 36 the control member 24 is subjected to spring bias striving to return the member 24 to the normal position thereof, FIGS. 8, 10a. The guide passage 20 provides cam slots 33¹for the retaining pin 23 which are disposed in a plane preferably chosen perpendicular to the drive shaft end 11. At depression of the actuator 35 on the control member 24 to the actuated position thereof, the retaining pin 23 is translated in parallel relation to itself from the retaining position shown in FIGS. 9a, 10a, to the release position shown in FIGS. 9b, 10 b. In this embodiment the movement of the locking rod 23 is a parallel translatory displacement transversely of the drive shaft end 11. When the actuator 35 is released, the flaps 36 will return the control member 24 to normal position corresponding to the retaining position of the retaining pin 23, FIGS. 9a, 10a.

In the two embodiments according to FIGS. 5—10 one has to actuate, by reason of the perpendicular transverse orientation of the cam slots 33¹, 33¹¹, the control member 24 manually when the socket element 15 is set onto the drive shaft end 11 as well as when it is taken off.

I claim: 7

1. Socket-retaining means for splined drive shafts comprising a drive shaft end having an axial bore extending inward from the end face thereof, a series of longitudinal splines alternated by longitudinal grooves on said drive shaft end, a socket element having an axial bore open at the rear end thereof and provided with a series of longitudinal internal grooves alternated by internal longitudinal splines detachably fitting said splines and grooves, respectively, of said drive shaft end, abutment means terminating said internal splines within said socket element in said bore, diametrically aligned guide slots disposed transversely of and traversing said drive shaft end and intersecting said axial bore therein, said guide slots being inclined with respect to a plane through the drive shaft axis and being at an acute angle relative to said plane, a retaining pin extending through said guide slot and guided for movement transversely of itself by said slots between a retaining position at one end of said slots, in which the outer extremities of said retaining pin are disposed within the axial extension of two peripherally opposed grooves of said drive shaft end for locking cooperation with two peripherally opposed abutment means on said socket element, and a release position at the other end of said slots, in which said outer extremities of said retaining pin are disposed within the axial extension of two peripherally opposed splines on said drive shaft end for releasing said socket element, a control member in said axial bore of said drive shaft end fixed to said retaining pin for conjoined movement together therewith between a normal position in said axial bore, in which said retaining pin is in said retaining position thereof, and an actuated position, in which said retaining pin is in said release position thereof, and adjustment means located at the end face of the drive shaft on said control member and movable in an axial direction for controlling the movement of said control member and retaining pin between said normal and retaining positions.

2. Socket-retaining means for splined drive shafts comprising, a drive shaft end having an axial bore extending inwardly from the end face of the shaft, a series of longitudinal splines on said drive shaft and alternated by longitudinal grooves, a socket element having an axial bore open at the rear end thereof and provided with a series of longitudinal internal grooves alternated by internal longitudinal splines detachably fitting said splines and grooves respectively, of the drive shaft end, abutment means terminating said internal splines within said socket element in said bore, a radial guide passage extending outwardly from the axial bore in the drive shaft end, a retainer disposed in the guide passage and movable transversely of itself therein between a retaining position, in which the outer extremity of said retainer is disposed within the axial extension of one of said grooves of the drive shaft end for locking cooperation with said abutment means on said socket element when said socket element is fitted on the drive shaft end and a release position in which the outer extremity of said retainer is disposed within the axial extension of one of said splines on said drive shaft end for releasing said socket element, and a control member in said axial bore of the drive shaft end for moving said retainer to said retaining and release positions thereof, the guide passage providing cam slots for said retainer radially at opposite sides of the intermediate portion thereof, said cam slots being inclined longitudinally of the drive shaft end for guiding the outer extremity of said retainer along a path inclined longitudinally with respect to a plane through the drive shaft axis and at an acute angle relative to said plane as it is moved between said retaining and release positions.

3. Socket-retaining means for splined drive shafts comprising, a drive shaft end having an axial bore extending axially inwardly from the end face of the shaft, a series of longitudinal splines alternated by longitudinal grooves on said drive shaft end, a socket element having an axial bore open at the rear end thereof and provided with a series of longitudinal grooves alternated by internal longitudinal splines detachably fitting said splines and grooves respectively, of said drive shaft end, abutment means terminating said internal splines within the socket element in said bore, a guide passage traversing said drive shaft and intersecting said axial bore thereof, a retaining pin disposed in the guide passage and movable transversely of itself therein between a retaining position, in which the opposite outer extremities of said retaining pin are disposed within the axial extension of two peripherally opposed grooves of said drive shaft end for locking cooperation with two opposed abutment means on the socket element, and a release position, in which the outer extremities of said retaining pin are disposed within the axial extension of two peripherally opposed splines on said drive shaft end for releasing said socket element, and a control member in said axial bore of said drive shaft end for moving said retaining pin to said retaining and release positions thereof, the retaining pin having an intermediate portion fixed to the control member for conjoined movement together therewith between a normal position in said axial bore and an actuated position therein spaced angularly of said normal position, and spring means between the control member and the drive shaft end for biasing said control member to said normal position, the control member being composed of rubber, the spring means being portions of said control member nonrotatably fixed to the drive shaft for elastic angular deformation relative thereto in said actuated position of said control member.

4. Socket-retaining means for splined drive shafts comprising, a drive shaft end having an axial bore extending inwardly from the end face of the shaft, a series of longitudinal splines alternated by longitudinal grooves on the drive shaft end, a socket element having an axial bore open at the rear end thereof and provided with a series of longitudinal internal grooves alternated by internal longitudinal splines detachably fitting said splines and grooves respectively, of the drive shaft end, abutment means terminating said internal splines within the socket element in said bore, a guide passage traversing said drive shaft and intersecting the axial bore thereof, a retaining pin disposed in said guide passage and movable transversely of itself therein between a retaining position, in which the opposite outer extremities of the retaining pin are disposed within the axial extension of two peripherally opposed grooves of the drive shaft end for locking cooperation with two opposed abutment means on the socket element, and a release position, in which the outer extremities of the retaining pin are disposed within the axial extension of the peripherally opposed splines on the drive shaft end for releasing said socket element, and a control member in said axial bore of the drive shaft end for moving the retaining pin to said retaining and release positions thereof, the retaining pin having an intermediate portion fixed to said control member for conjoined movement together therewith between a normal position in said axial bore and an actuated position therein spaced angularly of said normal position, and spring means between the control member and the drive shaft end for biasing the control member to the normal position, said guide passage providing guide slots for said retaining pin in a plane transverse to the drive shaft and disposed radially at opposite sides of the intermediate portion of the retaining pin, said guide slots guidingly receiving the retaining pin for guiding the outer extremities of said retaining pin along a path inclined longitudinally with respect to a plane through the drive shaft axis and at an acute angle relative to said plane as it is moved between said retaining and release positions, and turning means on the control member for the application of torque to move it angularly to said actuated position.

5. Socket-retaining means for splined drive shafts comprising, a drive shaft end having an axial bore extending inwardly from the end face of the shaft, a series of longitudinal splines alternated by longitudinal grooves on the drive shaft end, a socket element having an axial bore open at the rear end thereof and provided with a series of longitudinal internal grooves alternated by internal longitudinal splines detachably fitting the splines and grooves respectively, of said drive shaft end, abutment means terminating said internal splines within said socket element in said bore, a guide passage traversing said drive shaft end and intersecting said axial bore thereof, a retaining pin disposed in the guide passage and movable transversely of itself therein between a retaining position, in which the opposite outer extremities of the retaining pin are disposed within the axial extension of two peripherally opposed grooves of said drive shaft end for locking cooperation with two opposed abutment means on said socket element, and a release position, in which the outer extremities of said retaining pin are disposed within the axial extension of two peripherally opposed splines on said drive shaft end for releasing said socket element, a control member in said axial bore of the drive shaft end for moving said retaining pin to said retaining and release positions thereof, the retaining pin having an intermediate portion fixed to the control member for conjoined movement together therewith between a normal position in said axial bore and an actuated position therein spaced laterally of said normal 58 position, spring means between said control member and said drive shaft end for biasing the control member to said normal position, an actuator on the control member for moving said control member laterally in the axial bore to said actuated position, the control member being composed of rubber, and the spring means being portions of the control member adjacent to the retaining pin and being supported in the axial bore for elastic deformation transversely thereagainst in said actuated position of said control member.

6. Socket-retaining means for splined drive shafts comprising, a drive shaft end having an axial bore extending inwardly from the end face of said shaft, a socket element having an axial bore open at its rear end, the drive shaft end entering the socket, a member to the normal position, interfit between he socket and the drive shaft end when the drive shaft end is extended into the socket, a retaining pin located adjacent to the end of the drive shaft, a control member in the axial bore of the drive shaft fore moving the retaining pin to retaining or release positions of the pin, the retaining pin having an intermediate portion fixed to the control member for movement with the same between a normal position in the axial bore of the socket and an actuated position therein spaced laterally of the normal position, spring means between the control member and the drive shaft for biasing the control member to the normal position, an actuator on the control member for moving the same laterally in the axial bore of the drive shaft end to the actuated position, a guide passage in the bore of the socket, and guide passage including guide slots for said retaining pin in a plane transverse to said drive shaft end and disposed radially at opposite sides of the intermediate portion of the retaining pin, and said guide slots guidingly receiving said retaining pin for guiding said retaining pin along a path inclined longitudinally with respect to a plane through the drive shaft axis and at an acute angle relative to said plane as it is moved between said retaining and release positions.

7. Socket-retaining means for splined drive shafts comprising, a drive shaft end having at axial bore extending inwardly from the end face of the drive shaft, a series of longitudinal splines on the drive shaft and alternated by longitudinal grooves, a socket element having an axial bore open at the rear end thereof and provided with a series of longitudinal internal grooves alternated by internal longitudinal splines detachably fitting said splines and grooves respectively, of said drive shaft end, abutment means terminating said internal splines within the socket element in said bore, a radial guide passage extending outward from the axial bore in the drive shaft end, said guide passage having guide slots, a longitudinally extending retainer disposed in the guide passage and engaging in the guide slots and movable laterally therein and normally of the axial bore between a retaining position, in which the opposite outer extremities of the retainer are disposed within the axial extensions of the grooves of the drive shaft end and above the surface thereof for locking cooperation with said abutment means on the socket element when said socket element is fitted on the drive shaft end, and a release position in which the outer extremities of the retainer are disposed within the axial extensions of the splines on the drive shaft end and above the surface thereof for releasing the socket element, and a control member in said axial bore of the drive shaft end for moving the retainer to said retaining and release positions, the control member being connected to the retainer and movable normal to the axial bore, the control member being actuatable from the end face of the drive shaft.

8. Socket-retaining means for splined drive shafts comprising, a drive shaft end having an axial bore extending inwardly from the end face of the shaft, a series of longitudinal splines alternated by longitudinal grooves on the drive shaft end, a socket element having an axial bore open at the rear end thereof the provided with a series of longitudinal internal grooves alternated by internal longitudinal splines detachably fitting said splines and grooves respectively, of said drive shaft end, abutment means terminating said internal splines within the socket element in said bore, a guide passage traversing said drive shaft end and intersecting said axial bore thereof, said guide passage including guide grooves, a longitudinally extending retaining pin disposed in said guide passage and movable laterally therein and normally of the axial bore between a retaining position, in which the opposite outer extremities of the retaining pin are disposed within the axial extension of two peripherally opposed grooves of the said drive shaft end and above the surface thereof for locking cooperation with two opposed abutment means on said socket element, and a release position, in which the outer extremities of said retaining pin are disposed within the axial extension of two peripherally opposed splines on the drive shaft end and above the surface thereof for releasing said socket element, and a control member in said axial bore of the drive shaft end for moving said retaining pin to said retaining and release positions thereof, the control member and retaining pin being connected for conjoint movement transverse to the axial bore and being actuatable from the end of the drive shaft.

9. Socket-retaining means for splined drive shafts comprising, a drive shaft end having an axial bore extending inwardly from the end face of the shaft, a series of longitudinal splines, alternated by longitudinal grooves on the drive shaft end, a socket element having an axial bore open at its rear end and provided with a series of longitudinal grooves alternated by internal longitudinal splines detachably fitting said splines and grooves respectively of the drive shaft, abutment means terminating said internal splines within the socket in said bore, a guide passage traversing the drive shaft, and intersecting the axial bore thereof, a retaining pin disposed in said guide passage and movable transversely of itself therein between a retaining position in which the opposite outer extremities of said retaining pin are disposed with the axial extension of two peripherally opposed grooves of said drive shaft end for locking cooperation with two opposed abutment means on said socket element and a release position in which said outer extremities of said retaining pin are disposed within the axial extension of two peripherally opposed splines on said drive shaft end for releasing said socket element, and a control member in the axial bore of said drive shaft end for moving said retaining pin to said retaining and release position thereof, the retaining pin having an intermediate portion that is fixed to said control member for conjoined movement together therewith between a normal position in said axial bore and an actuated position therein spaced axially inward of said normal position, and spring means in said axial bore for biasing said control member to said normal position.

10. A socket-retaining means according to claim 9 in which said control member is of rubber, a shoulder in said axial bore, and said spring being a portion of said control member abutting on said shoulder and elastically deformable thereagainst in said actuated position of said control member.

11. Socket-retaining means according to claim 9 in which said guide passage provides cam slots for said retaining pin radially at opposite sides of said intermediate portion thereof, said cam slots being inclined longitudinally of said drive shaft end and guidingly receiving said retaining pin for defining said retaining position therefor when said control member is in said normal position and said release position therefor when said control member is in said actuated position.